(12) United States Patent
Clavette et al.

(10) Patent No.: US 7,960,957 B2
(45) Date of Patent: Jun. 14, 2011

(54) HEADROOM COMPENSATION CIRCUIT FOR VOLTAGE CONVERTER

(75) Inventors: Danny Richard Clavette, Greene, RI (US); Mark Crowther, Saunderstown, RI (US); George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 406 days.

(21) Appl. No.: 11/778,711

(22) Filed: Jul. 17, 2007

(65) Prior Publication Data
US 2008/0018321 A1  Jan. 24, 2008

Related U.S. Application Data

(60) Provisional application No. 60/807,894, filed on Jul. 20, 2006.

(51) Int. Cl.
*G05F 1/00* (2006.01)
(52) U.S. Cl. ............................. 323/284; 363/50; 323/272
(58) Field of Classification Search .................. 323/272, 323/282, 285, 280, 284; 363/50
See application file for complete search history.

(56) References Cited

U.S. PATENT DOCUMENTS

| | | | | |
|---|---|---|---|---|
| 4,419,619 A | * | 12/1983 | Jindrick et al. | ............... 323/257 |
| 2002/0125871 A1 | * | 9/2002 | Groom et al. | .................. 323/284 |
| 2006/0149486 A1 | * | 7/2006 | Tabaian et al. | .................. 702/64 |

* cited by examiner

*Primary Examiner* — Harry Behm
*Assistant Examiner* — Matthew Grubb
(74) *Attorney, Agent, or Firm* — Farjami & Farjami LLP

(57) ABSTRACT

A headroom compensation circuit for a voltage converter for ensuring that there is adequate headroom voltage to enable accurate operation of the current sense amplifier sensing the output current of the converter, the headroom compensation circuit comprising an error amplifier for comparing an output voltage of the converter to a reference voltage to set the converter output voltage; and a circuit for providing a bias current to an input of the error amplifier when a supply voltage to the current sense amplifier within a predefined threshold of the converter output voltage to cause the error amplifier to reduce the converter output voltage thereby to increase the headroom voltage for the current sense amplifier, said headroom voltage being defined as a voltage between the supply voltage to the current sense amplifier and said converter output voltage.

20 Claims, 5 Drawing Sheets

HEADROOM COMPENSATION CIRCUIT FOR VOLTAGE CONVERTER

CROSS-REFERENCE TO RELATED APPLICATIONS

The present application claims the benefit and priority of U.S. Provisional Application Ser. No. 60/807,894 filed Jul. 20, 2006 and entitled HEADROOM COMPENSATION CIRCUIT, the entire disclosure of which is hereby incorporated by reference.

BACKGROUND OF THE INVENTION

The present invention relates to converter circuits, and in particular, to a circuit for ensuring that sufficient voltage is provided for operating a current sense amplifier circuit which senses the output current of the converter. This is particularly important in multi-phase converters where there are plural phases each sharing in the output load.

In a multi-phase converter, plural converters are coupled together at an output node to provide an output voltage. In a buck converter topology, for example, each converter comprises two series connected switches connected across a voltage bus. The switches are alternately controlled, typically by pulse width modulated signals, to ensure that a desired output voltage appears at the output node. The output voltage is regulated by a feedback loop. Typically, each converter is operated in a phased relationship with the other phases, so at any instant in time, one control switch of the converter is on. In a buck converter topology, the switched node between the two switches is coupled to the output node by an inductor. The energy stored in the inductor is coupled to an output storage capacitance. Each of the plural switching converters is coupled through a respective inductor to the output capacitance. The load is connected across the output capacitance.

In such a multi-phase converter, it is important that each phase or channel (switching converter) provide an equal share of the total load current or poor efficiency will occur. It is also possible that the power supply will be damaged if a phase provides too much current in comparison to the other phases. One way to ensure that the phases share equally in the overall current load is to sense the current in each phase, i.e., the inductor current in each phase and use that current information to force current sharing by modulating individual converter phase duty cycles. The current information needs to be accurate and is a critical parameter.

Inductor current can be sensed by connecting a network comprising a series resistor and a capacitor in parallel with the inductor and measuring the voltage across the capacitor. This current sensing circuit is shown in FIG. 2. Usually the resistor RCS and the capacitor CCS are chosen so that the time constant of RCS and CCS equals the inductive time constant which is the inductance L divided by the inductor direct current resistance (DCR) RL or the inherent resistance of the inductor, i.e., $L/R_L$. If the two time constants match, the voltage across CCS is proportional to the current through the inductor and the sense circuit can be treated as if only a sense resistor with the value of RL was used. A mismatch of the time constants does not affect the measurement of inductor DC current but affects the AC component of the inductor current.

An advantage of sensing the inductor current in this way versus high side or low side switch sensing is that actual output current being delivered to the load is obtained rather than peak or sampled information about the switch currents. The output voltage can be positioned to meet a load line based on real time information. This method is also preferable to using a sense resistor in series with the inductor because this results in greater losses.

The current sense amplifier (CSA) shown in FIG. 2 operates with a common mode input equivalent to the output voltage VOUT where VOUT is the regulated voltage provided to the load. The current sense amplifier (CSA) inputs may eventually run out of headroom as the regulated voltage VOUT is increased. This is because the output voltage VOUT, if it is increased too much, approaches the voltage VCC powering the current sense amplifier. The current information reported by the current sense amplifier operating with inadequate headroom is useless and could be potentially grossly incorrect. The result is that current sharing does not occur or the sense circuit will force incorrect current sharing to the point of destruction of the converter or a portion of the converter.

As an example, in the current sense circuit of FIG. 2, the current sense amplifier is powered by voltage VCC which is typically coupled to an undervoltage lockout (UVLO) circuit which, as an example, will prevent operation of the circuit at a minimum VCC of 6.5 volts. Thus, the UVLO circuit will shut down the converter if VCC goes under 6.5 volts. If VOUT, for example, is set to 5.5 volts, this results in only one volt of current sense amplifier headroom. In a typical application, the nominal headroom requirement is 1.75 volts, 0.75 volts higher than the one volt headroom in this particular example, for proper current sense amplifier operation. One way to correct this is to increase the VCC UVLO threshold to a higher voltage, but this is not an adequate solution because it is desirable to have the ability to operate the converter at low VCC voltages to provide low VOUT voltages such as 1.2 volts where the current sense amplifiers will have sufficient headroom. So, because the circuit must be capable of being used with low VCC voltages, increasing the UVLO threshold is not an option.

It is desirable to provide a circuit which will allow the current sense amplifier to have adequate headroom voltage, i.e., the difference between the VCC voltage and the output voltage of the converter, and which does not require the UVLO threshold to be increased.

SUMMARY OF THE INVENTION

According to the invention, a headroom compensation circuit is provided for a voltage converter for ensuring that there is adequate headroom voltage to enable accurate operation of the current sense amplifier sensing the output current of the converter, the headroom compensation circuit comprising an error amplifier for comparing an output voltage of the converter to a reference voltage to set the converter output voltage; and a circuit for providing a bias current to an input of the error amplifier when a supply voltage to the current sense amplifier comes within a predefined threshold of the converter output voltage to cause the error amplifier to reduce the converter output voltage thereby to increase the headroom voltage for the current sense amplifier, said headroom voltage being defined as a voltage between the power supply voltage to the current sense amplifier and said converter output voltage.

Although the invention is particularly useful in a multi-phase converter circuit, it can be applied to a single phase converter circuit to ensure proper current sense amplifier operation.

Other objects, features and advantages of the invention will be apparent from the detailed description which follows.

BRIEF DESCRIPTION OF THE DRAWING(S)

The invention will now be described in greater detail in the following detailed description with reference to the drawings in which FIG. 1 shows an example of a multi-phase converter employing the circuit of the invention;

DETAILED DESCRIPTION OF PREFERRED EMBODIMENTS OF THE INVENTION

Figure 1A:
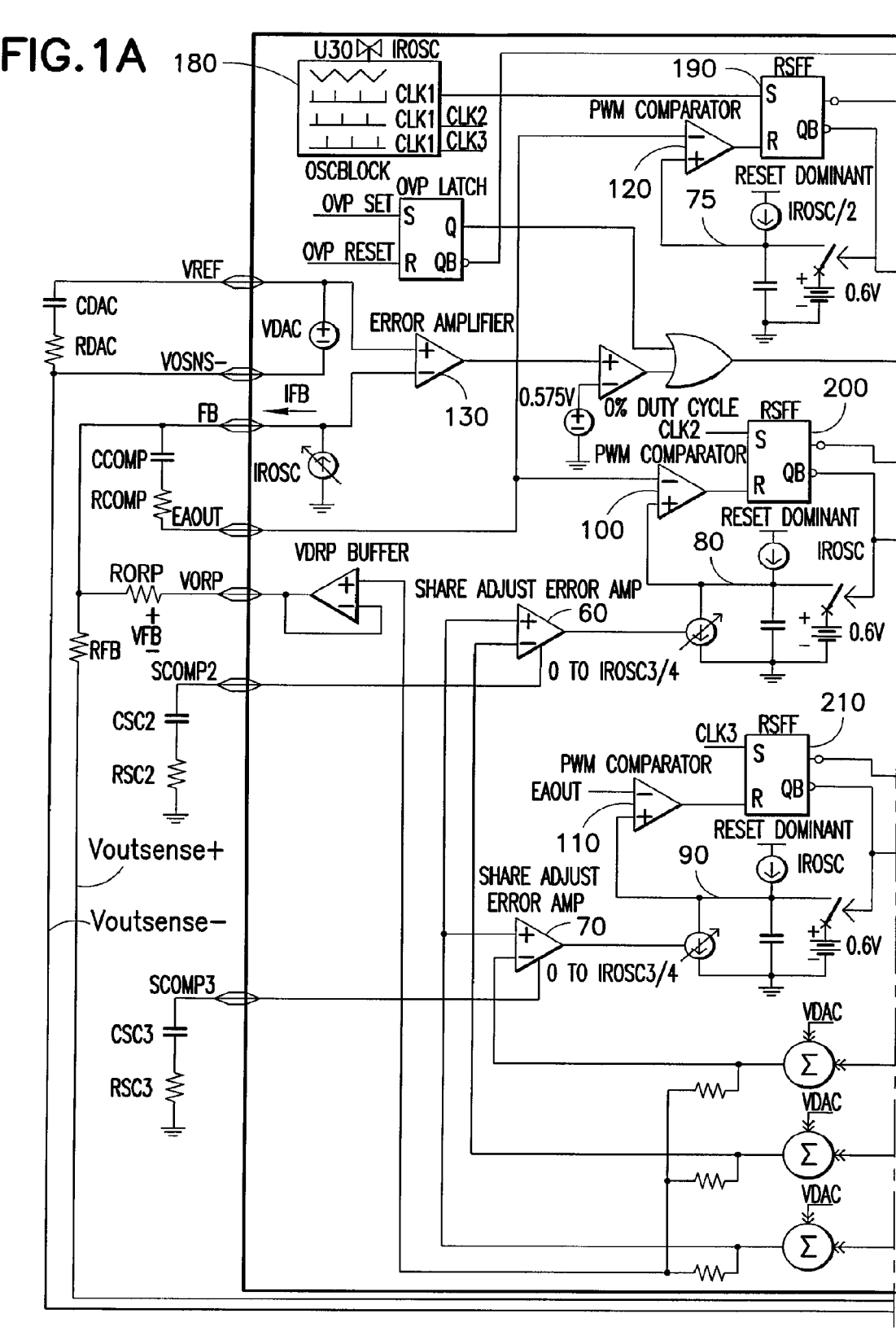
Figure 1B:
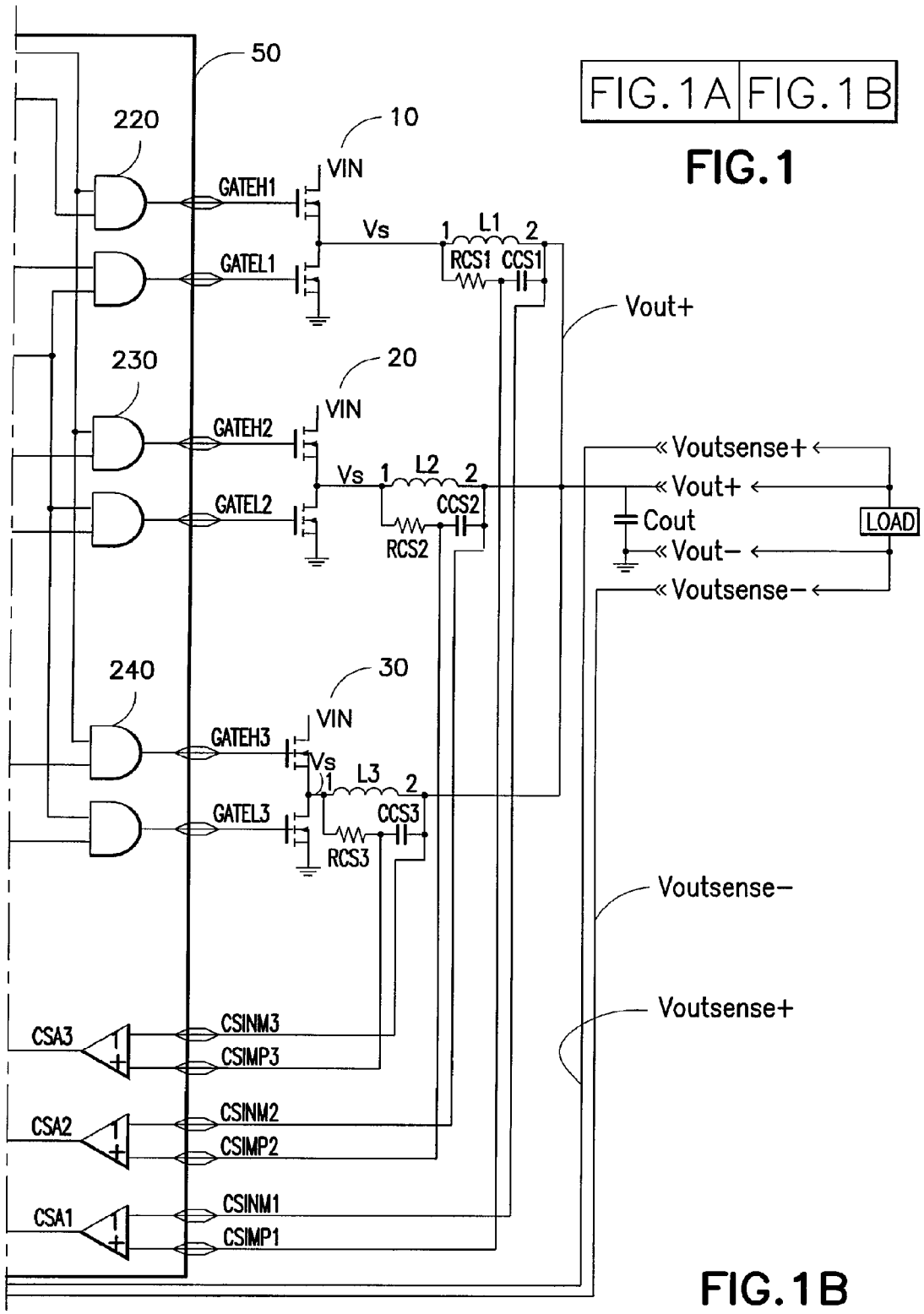

With reference now to the drawings, FIG. 1 shows a block diagram of a multi-phase converter. The multi-phase converter includes a plurality of switching converter circuits 10, 20, 30, in this case, three switching circuits so it is a three-phase converter. Each switching circuit 10, 20, 30 includes two transistors coupled in series with the switched nodes VS between the switches. The switches are coupled between a voltage source VIN and ground. Each transistor is driven by a respective high side and low side driver output from a control integrated circuit 50. The switched node VS in each case is coupled through a respective inductor L1, L2 and L3 to a common output node VOUT+ across which a storage capacitor COUT is disposed. The load is coupled through suitable connections across VOUT+ and VOUT−. Sensing lines VOUTSENSE+ and VOUTSENSE− are provided at the load to sense the output voltage at the load. VOUTSENSE+ and VOUTSENSE− are provided to inputs of the integrated circuit 50. In particular, VOUTSENSE+ is coupled through a feedback resistor RFB to an input FB and VOUTSENSE− is coupled through an RC network comprising RDAC and CDAC to VREF. These inputs are provided to the error amplifier 130 inputs.

Each inductor L1, L2 and L3 includes a current sensing network comprising a resistor RCS1, CCS1; RCS2, CCS2; and RSC3, CCS3, which operate as described above to sense the current in each inductor and thus the current of each phase. The current in the inductor is proportional to the voltage across the current sensing capacitor CCS. A respective current sense amplifier CSA1, CSA2, CSA3 is coupled across the capacitor and the outputs of each of the CSAs are summed with reference voltage VDAC which sets the desired converter output voltage. The outputs of the summing stages are provided to two share adjust error amplifiers 60 and 70 which adjust the current sourced to oscillator circuits, 80,90 to adjust a reference voltage oscillator ramp waveform provided to respective PWM comparators 100, 110 at their non-inverting inputs. PWM comparators 100 and 110 as well as the PWM comparator 120 for the first phase control provision of pulse width modulated signals via latches and logic circuitry to the gates of the switching stages 10, 20 and 30. The first switching stage 10 is controlled via PWM comparator 120 whose current share is not adjusted. In this way, by adjusting the currents provided by the stages 20 and 30, the currents in all stages 20 and 30 are equalized to an average current. The oscillator circuits 75, 80 and 90 provide a ramp signal to each of the comparators 120, 100 and 110 against which the error amplifier output from error amplifier 130 is compared to set the pulse width modulation. The oscillator period is determined by clock pulses CLK1, CLK2, CLK3 provided by a clock circuit 180.

Error amplifier 130 receives a feedback proportional to VOUTSENSE+ at its inverting input and a reference signal equal to the desired converter output voltage VDAC at its non-inverting input.

The error amplifier 130 compares the voltage VDAC against the output voltage of the converter to determine how the output voltage differs from the desired output voltage. This is fed into each of the PWM comparators 120,100 and 110 to determine the necessary pulse width modulation to regulate the output voltage.

Further, a clock circuit 180 is provided to clock the latches 190, 200 and 210 to synchronize the PWM signals to the clock frequency. The output of the latches are provided to logic circuitry 220, 230, 240 for each switching circuit to control the phase sequenced turning on and turning off of the switches of each switching circuit in a complementary manner to control the output voltage of the converter.

As explained above, a problem arises if the headroom voltage between the minimum power supply voltage for the current sense amplifier CSA1, CSA2 and CSA3 (as determined by the undervoltage lockout threshold (UVLO) and the output voltage (VOUT) of the converter is below a predetermined threshold, for example, 1.75 volts. If, as explained above, the UVLO threshold is 6.5 volts and the output voltage is 5.5 volts, there is only one volt of headroom and this is inadequate for accurate operation of the current sensing amplifiers. It is not desirable to increase the UVLO threshold because it is desirable that these converter circuits be operational at lower VCC voltages when lower VOUT voltages are required at the output. For example, as described above, at times the output voltage will be as low as 1.2 volts or even lower. It is therefore desirable to be able to operate the CSAs at low VCC levels, so the UVLO threshold should not be increased.

According to the invention, as shown in FIG. 1, as the CSA headroom is encroached, a bias current IFB is forced out of voltage feedback pin FB which senses the output voltage through a series resistor RFB. According to another embodiment, described in FIG. 4, VOUT is provided via a resistor divider coupled to the feedback pin. In either case, the bias current effectively causes the error amplifier 130 to reduce the regulated output voltage VOUT+, which is the CSA common mode voltage, by producing a V=IR offset voltage across the resistor RFB or resistor divider. With this approach, adequate CSA headroom voltage can be guaranteed. The output voltage VOUT will be out of specification if the CSA headroom is encroached. However, the power supply will not be damaged and VOUT will be regulated to the desired level once VCC is increased sufficiently.

As shown in FIG. 1, current from the pin FB will develop an offset voltage VFB across RFB to force the regulated output voltage lower. The offset voltage will cause the voltage at the error amplifier inverting input to increase, thereby driving the error amplifier output lower which reduces the pulse width modulation duty cycle to the high side transistor of each switching stage thereby to force the output voltage lower. With the reduced output voltage, the difference between VCC for each current sense amplifier and the output voltage is greater and therefore there is adequate headroom to enable the current sense amplifiers CSA to accurately sense the current in each phase and regulate the current sharing between phases.

Figure 3:
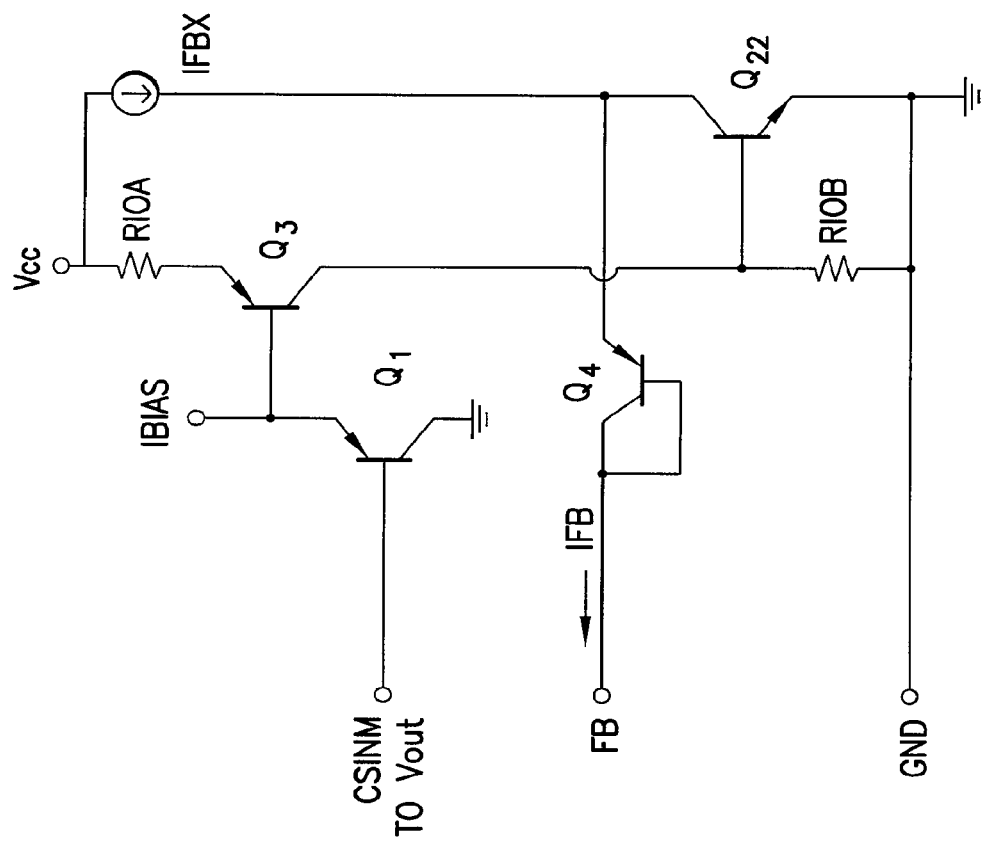
FIG. 3 shows details of an internal circuit which can be incorporated into the multi-phase controller to ensure adequate headroom for the current sense amplifier.
Figure 2:
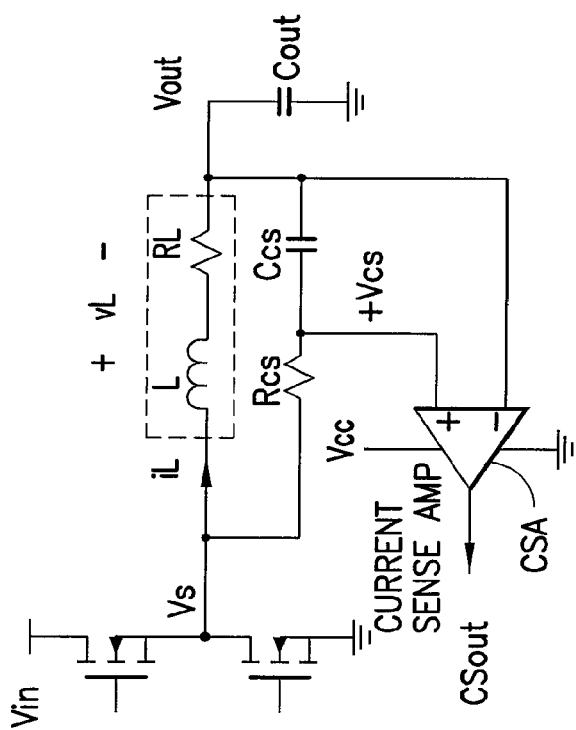
FIG. 2 shows a current sense amplifier circuit to which the invention is applicable.

FIG. 3 shows details of a circuit in IC 50 of FIG. 1 which causes the bias current to be forced out of the feedback FB pin to generate the offset voltage VFB across the feedback resistor RFB. As shown in FIG. 3, as long as pin CSINM is low (this is tied to the converter output) transistor Q22 remains on and shunts current on the node IFBX to ground. Q4 provides diode isolation to FB. Once CSINM, which is tied to the output voltage, gets close enough to VCC, the voltage powering the current sense amplifiers, the voltage reduces across R10A and Q22 begins to debias allowing some of the current IFBX to exit on to the FB pin and thus to generate the offset voltage VFB.

Figure 4:
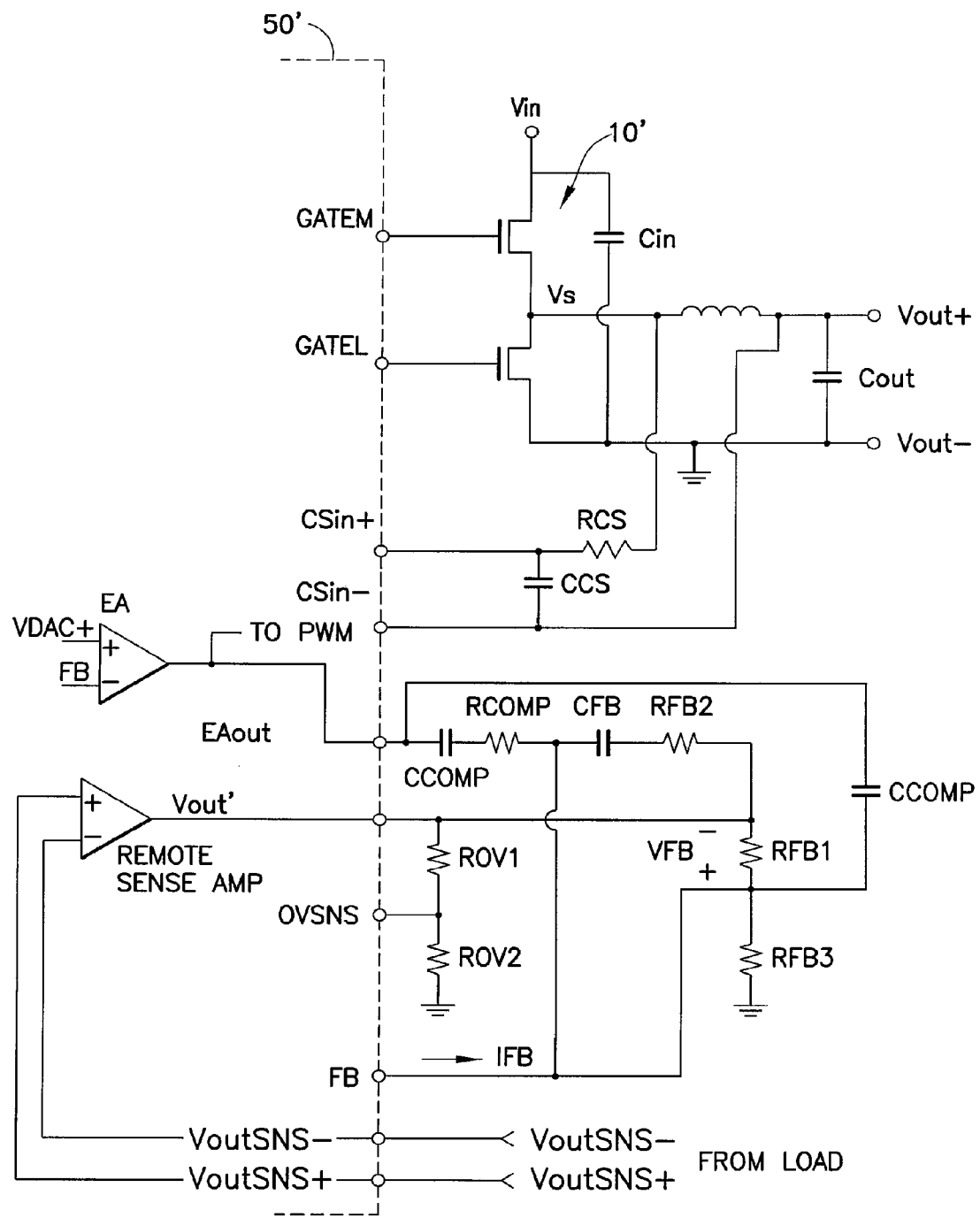
FIG. 4 shows another circuit showing only one converter, for ensuring adequate headroom for the current sense amplifier.

FIG. 4 shows another embodiment of the headroom compensation circuit. The integrated circuit 50' is illustrated by the dashed lines and the pins of integrated circuit 50' are shown by the pins gate H, gate L, CSIN+, CSIN−, EAOUT, VOUT', OVSENSE, FB and VOUTSENSE− and VOUTSENSE+. There are additional pins on the integrated circuit not shown because they are not relevant to the headroom compensation circuit.

In FIG. 4 only one switching stage 10' is shown. For a multi-phase converter there would be plural switching stages, as in FIG. 1. In addition, only one current sense circuit comprising RCS and CCS is shown, and the inputs to the current sense amplifier are shown at CSIN+ and CSIN−. For a multi-phase converter, these current sense circuits would be duplicated and the current sense amplifiers would also be duplicated.

At the bottom of FIG. 4, the headroom compensation circuit is shown. As in FIG. 1, the error amplifier output is provided to capacitor CCOMP and resistor RCOMP to the feedback pin FB. A feedback capacitor CFB and a resistor divider comprising RFB1 and RFB2 is coupled across the pin VOUT.' VOUT' is coupled through a remote sense amplifier in IC50' across the load to the VOUTSENSE− and VOUTSENSE+ inputs, as in FIG. 1. Overvoltage sensing input $OV_{SNS}$ is provided to IC50' from resistor divider ROV1, ROV2 to provide overvoltage protection.

As in FIG. 3, a current IFB is forced out of the feedback pin if the output voltage and the voltage VCC come within a predetermined threshold amount. The current IFB causes a current to flow in the resistor divider RFB1, RFB2 causing an offset voltage VFB at VOUT'. This increases the voltage at the pin FB which, like in FIG. 1, is connected to the inverting input of the error amplifier. This increasing the voltage at the inverting input, causing the output of the error amplifier to be reduced thereby reducing the output voltage of the converter. As an example, when VOUTSENSE+ in FIG. 4 gets within a prescribed threshold, for example, 1.75 volts of VCC, a current IFB is forced out of the pin FB. This develops an offset voltage in RFB1, RFB2 which, as discussed above, causes the error amplifier to regulate VOUT to a lower voltage.

Figure 5:
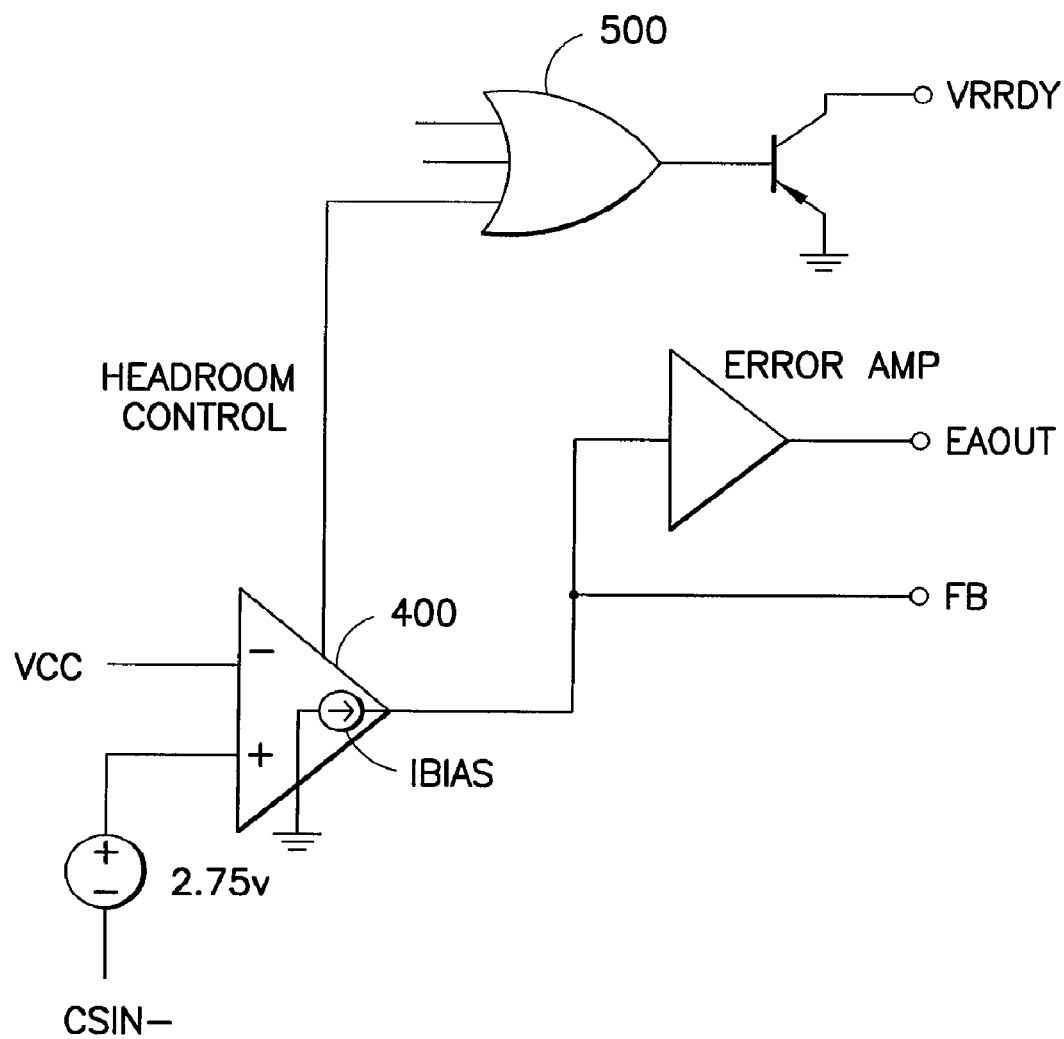
FIG. 5 shows a further aspect of the invention.

According to the invention, it is also possible to add a comparator with hysteresis that will flag a system monitor pin if the CSA headroom is encroached. This is shown in FIG. 5. The amplifier 400 comprises a comparator with hysteresis that compares VCC and the input CSIN− referenced to 2.75 V or the desired threshold. When VCC drops to within 2.75 V of CSIN−, the amplifier 400 produces the bias current on FB, as discussed previously. It also issues a signal "headroom control" to a logic circuit 500, for example an OR circuit, which disables Signal VRRDY to alert the system monitor of headroom encroachment.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A headroom compensation circuit for a voltage converter for ensuring that there is adequate headroom voltage to enable accurate operation of a current sense amplifier sensing an output current of the voltage converter, the headroom compensation circuit comprising:
   an error amplifier for comparing a converter feedback voltage to a reference voltage to set a desired converter output voltage based on an amplified difference of the converter feedback voltage and the reference voltage; and
   a circuit for providing a bias current to an input of the error amplifier when a supply voltage to the current sense amplifier is within a predefined threshold of the converter output voltage to cause the error amplifier to reduce the desired converter output voltage by directing a portion of the bias current away from the input of the error amplifier and thereby reducing the converter feedback voltage by an offset voltage.

2. The headroom compensation circuit of claim 1, wherein the voltage converter is a multi-phase converter.

3. The headroom compensation circuit of claim 1, wherein the bias current circuit comprises a current source and a switch coupled to said input of said error amplifier, said switch controlling current from said current source to said input of said error amplifier, and further comprising a threshold circuit for comparing said supply voltage to said converter feedback voltage for controlling said switch to supply said bias current to said error amplifier input to provide an offset voltage on said error amplifier input when said supply voltage comes within the predefined threshold of said converter feedback voltage.

4. The headroom compensation circuit of claim 1, wherein the bias current is provided across a resistor in series with said input of said error amplifier.

5. The headroom compensation circuit of claim 1, wherein said bias current is provided to a resistor divider coupled to said input of said error amplifier.

6. The headroom compensation circuit of claim 1, wherein the bias current provides an offset voltage across a resistance coupled to said error amplifier input whereby the error amplifier reduces the desired converter output voltage of the converter.

7. The headroom compensation circuit of claim 1, further comprising a comparator with hysteresis that flags a system monitor pin.

8. A headroom compensation circuit for adjusting a headroom of a current sense amplifier used to sense an output of a voltage converter, the headroom compensation circuit comprising:
   an error amplifier to produce an error signal corresponding to a difference of a converter feedback voltage and a reference voltage; and
   a force-out circuit to force a bias current away from the error amplifier when a sensed converter output voltage is encroaching the headroom of the current sense amplifier, thereby reducing the converter feedback voltage by an offset voltage;
   the error signal adapted to set a desired converter output voltage.

9. The headroom compensation circuit of claim 8, wherein the bias current is provided to a resistor divider coupled to an input of the error amplifier.

10. The headroom compensation circuit of claim 8, wherein the voltage converter is a multi-phase converter.

11. The headroom compensation circuit of claim 8, wherein the offset voltage occurs across a resistor series with an input of the error amplifier, the bias current flowing through the resistor.

12. The headroom compensation circuit of claim 8, further comprising a comparator with hysteresis, the comparator capable of flagging a system monitor pin if the sensed converter output voltage is encroaching the headroom of the current sense amplifier.

13. The headroom compensation circuit of claim 8, wherein the force-out circuit is integrated into an integrated circuit (IC).

14. The headroom compensation circuit of claim 13, wherein:
the IC comprises a transistor;
the IC outputs the bias current when the sensed converter output voltage encroaches the headroom of the current sense amplifier.

15. The headroom compensation circuit of claim 14, wherein the transistor is a bipolar junction transistor (BJT).

16. A method for use by a headroom compensation circuit for adjusting a headroom of a current sense amplifier used to sense an output of a voltage converter, the method comprising:
producing an error signal corresponding to a difference of a converter feedback voltage and a reference voltage;
forcing a bias current away from an error amplifier when a sensed converter output voltage is encroaching the headroom of the current sense amplifier, thereby reducing the converter feedback voltage by an offset voltage
adapting the error signal to set a desired converter output voltage.

17. The method of claim 16, further comprising flagging a system monitor pin if the sensed converter output voltage is encroaching the headroom of the current sense amplifier.

18. The method of claim 16, wherein the offset voltage occurs across a resistor series with an input of the error amplifier, the bias current flowing through the resistor.

19. The method of claim 16, wherein the bias current is provided to a resistor divider coupled to an input of the error amplifier.

20. The method of claim 16, wherein the voltage converter is a multi-phase converter.

* * * * *